United States Patent [19]

Woo

[11] Patent Number: 4,536,564
[45] Date of Patent: Aug. 20, 1985

[54] POLYAMIDE FROM BIS-CARBOXY CONTAINING 3,5,3',5'-TETRAOXO-1,2-DIPIPERAZINE COMPOUND AND DIAMINE

[75] Inventor: Edmund P. Woo, Midland, Mich.

[73] Assignee: The Dow Chemical Company, Midland, Mich.

[21] Appl. No.: 560,034

[22] Filed: Dec. 9, 1983

[51] Int. Cl.³ .............................................. C08G 69/26
[52] U.S. Cl. ................................... 528/341; 528/172; 528/173; 528/183; 528/184; 528/322; 528/327; 528/328; 528/338; 528/339; 528/340; 544/357; 544/359; 544/384; 544/385
[58] Field of Search ............... 528/341, 327, 328, 322, 528/172, 173, 183, 184, 338, 339, 340; 544/357, 359, 384, 385

[56] References Cited

U.S. PATENT DOCUMENTS 3,719,640  3/1973  Lee et al. ............................ 528/341

*Primary Examiner*—Harold D. Anderson
*Attorney, Agent, or Firm*—Norman L. Sims

[57] ABSTRACT

The invention includes novel dicarboxylic acids derived from alkylene or arylene diaminetetraacetec acid corresponding to the formula

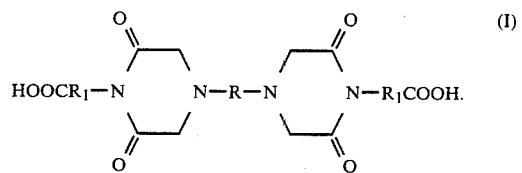

These dicarboxylic acids derived from alkylene or arylene diaminetetraacetic acid are useful in the preparation of polyamides.

Another aspect of the invention is a polymer prepared from between about 1 and 100 mole percent of the diamine salt of the compound represented by formula (I)

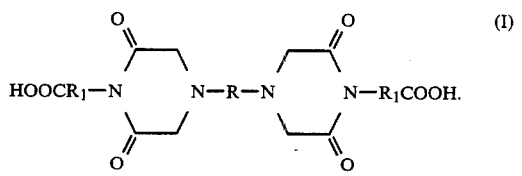

These polymers are useful in preparing molded articles.

8 Claims, No Drawings 4,536,564

POLYAMIDE FROM BIS-CARBOXY CONTAINING 3,5,3',5'-TETRAOXO-1,2-DIPIPERAZINE COMPOUND AND DIAMINE

This is a continuation of copending application Ser. No. 411,170, filed Aug. 25, 1982, now abandoned.

BACKGROUND OF THE INVENTION

This invention relates to novel dicarboxylic acids and a process for preparing such compounds. More particularly, this invention relates to dicarboxylic acids derived from an alkylene or arylene diaminetetraacetic acid.

These dicarboxylic acids derived from alkylene or arylene diaminetetraacetic acid are useful in the preparation of polyamides. Polyamides are crystalline polymers which exhibit excellent molding characteristics, but are opaque. It is desirable to prepare polymers with the melt characteristics of polyamides which are also translucent or transparent.

SUMMARY OF THE INVENTION

Novel dicarboxylic acids derived from alkylene or arylene diaminetetraacetic acid correspond to the formula

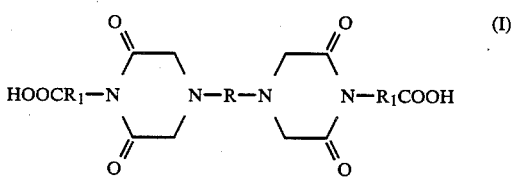

wherein

R is a $C_{1-20}$ alkylene group, phenylene group, arylalkylene group, cycloalkylene group, diphenylene group, or —$R_2$—X—$R_2$—;

X is O, S or $SO_2$;

$R_2$ is independently in each occurrence a $C_{1-10}$ alkylene group, phenylene group, arylalkylene group or a cycloalkylene group; and $R_1$ is a $C_{1-20}$ alkylene group, phenylene group, arylalkylene group or a cycloalkylene group.

These dicarboxylic acids are prepared by a process comprising contacting an alkylene or arylene diaminetetraacetic anhydride represented by the formula

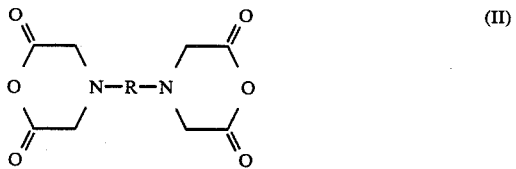

with an amine-substituted carboxylic acid represented by the formula $$H_2N-R_1-COOH \quad (III)$$

in a solvent comprising a high boiling phenolic compound and an aromatic hydrocarbon capable of forming an azeotrope with water, refluxing the mixture, and removing the water formed in the process as an azeotrope with the aromatic hydrocarbon, until such time as the azeotrope is water-free. In the formulas provided, R and $R_1$ are as previously defined.

DETAILED DESCRIPTION OF THE INVENTION

The novel dicarboxylic acids described herein are represented by the formula

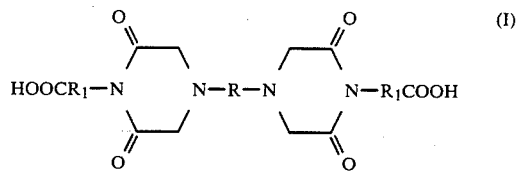

wherein R and $R_1$ are as defined above. R is preferably a $C_{1-5}$ alkylene group, phenylene group, diphenylene group, or —$R_2$—X—$R_2$— wherein $R_2$ is preferably a $C_{1-5}$ alkylene group or a phenylene group. R is more preferably an ethylene group, phenylene group or —$R_2$—X—$R_2$— wherein $R_2$ is preferably an ethylene or phenylene group. R is most preferably ethylene.

$R_1$ is preferably a $C_{1-5}$ alkylene group or a phenylene group, and most preferably a methylene group, pentamethylene group or a phenylene group.

These novel dicarboxylic acids are derived from alkylene or arylene diaminetetraacetic acids, which from a well-known class of compounds which can be readily prepared by standard methods known in the art. Alkylene or arylene diaminetetraacetic acids are reacted with acetic anhydride to prepare alkylene or arylene diaminetetraacetic anhydrides, as taught by Dazzi, U.S. Pat. No. 3,660,388 (incorporated herein by reference). A preferred alkylene or arylene diaminetetraacetic acid is ethylene diaminetetraacetic acid.

These alkylene or arylene diaminetetraacetic anhydrides are contacted with amine-substituted carboxylic acids to prepare the novel dicarboxylic acids. Such reaction is represented by the equation

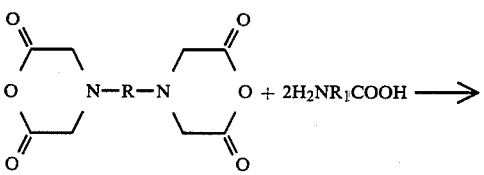

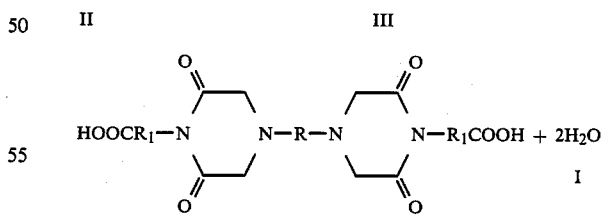

The alkylene or arylene diaminetetraacetic anhydrides are preferably contacted with the amine-substituted carboxylic acid in a 2:1 molar ratio. The reactants are contacted in a solvent comprising a high boiling phenolic compound and an aromatic hydrocarbon. Suitable high boiling phenolic compounds include cresols, xylenols, phenols and cresylic acid, which is a commercially available mixture of high boiling phenolic compounds. The aromatic hydrocarbon must form an azeotrope with water at reflux. Suitable aromatic hydrocarbons include benzene and alkyl-substituted benzenes, such as toluene, xylene, ethyl benzene and chloro aromatic benzene.

In preparing the novel dicarboxylic acids, the solvent containing the above-described reactants is heated to reflux. During reflux, the water formed in the reaction forms an azeotrope with the aromatic hydrocarbon. This azeotrope is removed from the reaction zone to remove the water. Reflux is continued until no more water is formed.

The dicarboxylic acid formed by this process can be recovered by conventional means. Suitable methods for recovery of the dicarboxylic acid include distillation of the aromatic hydrocarbon from the reaction mixture and stirring the residue with ether.

These novel dicarboxylic acids are useful as monomers in the preparation of polyamides. These polyamides are prepared from between about 1 and 100 mole percent of the diamine salt of the novel dicarboxylic acids represented by formula (I)

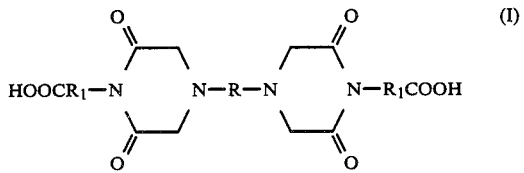

and between about 0 and 99 mole percent of the diamine salt of a dicarboxylic acid represented by formula (IV)

wherein the diamine is represented by the formula $H_2N-R_3-NH_2$ wherein R and $R_1$ are defined above; $R_3$ is a $C_{1-12}$ alkylene group, cycloalkylene group

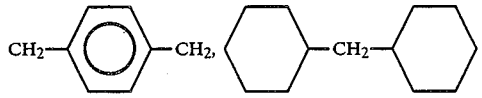

and

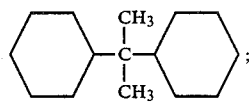

and $R_4$ is a $C_{1-10}$ alkylene group or a phenylene group. It is preferable to prepare polyamides comprising from between about 5 and 20 mole percent of a diamine salt of the novel dicarboxylic acid represented by formula I and between about 80 and 95 mole percent of a diamine salt of the dicarboxylic acid represented by formula IV.

The novel dicarboxylic acid diamine salt can be prepared by dissolving the novel dicarboxylic acids in methanol and adding to the solution one of the diamines described above. The salt formed crystallizes upon cooling and can be recovered by filtration.

The polyamides can be prepared by either solution or melt polymerization processes, which are well-known in the art. In one embodiment of a solution polymerization, the diamine salt of the novel dicarboxylic acid is contacted with the diamine salt of a dicarboxylic acid represented by formula IV and refluxed in a solvent comprising a high boiling phenol and an aromatic hydrocarbon capable of forming an azeotrope with water, such as a mixture of m-cresol and toluene, for about 10 to 19 hours. In one embodiment of a melt polymerization, a diamine salt of the novel dicarboxylic acid is contacted with a diamine salt of a dicarboxylic acid of formula IV in the presence of a manganese salt, such as manganese hypophosphite and the mixture is heated to between about 200° C. and 230° C. for between about 2 and 20 hours.

The incorporation of the novel dicarboxylic acids into polyamides imparts certain desirable properties to such polymers. Such polyamides exhibit surprising translucence or transparence whereas most polyamides are opaque.

The polyamides produced are amorphous when prepared or molded, but upon heating crystallize into a polymer with a high melt temperature. The polymers produced offer the ease of the molding characteristics exhibited by crystalline materials and the transparency of molded materials.

SPECIFIC EMBODIMENTS

The following examples are included for illustrative purposes only and are not intended to limit the scope of the invention as described or claimed herein.

EXAMPLE 1

Preparation of 4,4'-biscarboxymethyl-3,5,3',5'-tetraoxo-1,2-dipiperizinoethane

A mixture of ethylene diaminetetraacetic dianhydride (5.12 g, 0.02 mole), glycine (3.0 g, 0.04 mole), m-cresol (50 ml) and toluene (25 ml) was refluxed for 11 hours and the water formed was removed as an azeotrope with toluene. As the reaction progressed, the solid materials slowly dissolved. The solvents were removed by distillation at reduced pressure and the residue stirred with ether to give 7.1 g (96 percent yield) of 4,4'-biscarboxymethyl-3,5,3',5'-tetraoxo-1,2-dipiperizinoethane, m.p. 242° C.-243° C. (dec.).

EXAMPLE 2

Preparation of 4,4'-bis(5-carboxypentyl)-3,5,3',5'-tetraoxo-1,2-dipiperizinoethane By the procedure described in Example 1, 5.12 g (0.02 mole) of ethylene diaminetetraacetic dianhydride and 5.25 g (0.04 mole) of ω-aminocaproic acid were converted to 6.4 g (66 percent) of 4,4'-bis(5-carboxypentyl)-3,5,3',5'-tetraoxo-1,2-dipiperizinoethane, m.p. 148° C.-151° C.

EXAMPLE 3

Preparation of novel dicarboxylic acid-diamine salt 4,4'-Bis(5-carboxypentyl)-3,5,3',5'-tetraoxo-1,2-dipiperizinoethane (12.07 g, 0.025 mole) was dissolved in 200 ml methanol, to which was added 2.97 g (0.0255 mole) hexamethylenediamine. Upon cooling to room temperature, the salt which crystallized was isolated by filtration, 13.2 g, 87.8 percent yield. The pH of a 1 percent solution was 7.10.

EXAMPLE 4

Solution Polymerization

A stirred mixture of the 4,4'-bis(5-carboxypentyl)-3,5,3',5'-tetraoxo-1,2-dipiperizinoethane-hexamethylenediamine salt (2.00 g, 0.0033 mole, 8 mole percent), adipic acid-hexamethylenediamine salt (10.00 g, 0.0382 mole), m-cresol (30 ml) and toluene (5 ml) was refluxed under a nitrogen atmosphere for 10 hours. The copolyamide 9.2 g was isolated by precipitation in methanol, 87.6 percent yield.

EXAMPLE 5

Melt Polymerization

Various molar ratios of the 4,4'-bis(5-carboxypentyl)-3,5,3',5'-tetraoxo-1,2-dipiperizinoethane-hexamethylenediamine salt and an adipic acid-hexamethylenediamine salt along with $Mn(H_2PO_2)_2H_2O$ were sealed in a stainless steel tube and heated at 215° C. for between 2 and 11 hours. The results are shown in Table I below.

TABLE I

| Novel dicarboxylic acid (mole %) | Time (hr) | $Mn(H_2PO_2)_2H_2O$ (wt. %) | $\eta_{inh}$ m-cresol |
|---|---|---|---|
| 12.7 | 2 | None | insoluble |
| 15.0 | 2 | 0.7 | 0.30 |
| 15.0 | 6 | 0.7 | 0.58 |
| 15.0 | 8 | 0.7 | 0.70 |
| 15.0 | 11 | 0.7 | 0.48 |

EXAMPLE 6

Several polymers were prepared from the 4,4'-bis(5-carboxypentyl)-3,5,3',5'-tetraoxo-1,2-dipiperizinoethane-hexamethylenediamine salt and an adipic acid-hexamethylenediamine salt with various molar ratios of the salts. The DSC thermal transitions of the various polymers were measured. The results are compiled in Table II.

TABLE II

| Novel Dicarboxylic acid (mole %) | Tg °C. | Tm °C. |
|---|---|---|
| 0 | 49 | 262 |
| 8 | 49 | 244 |
| 15 | 48 | 217 |
| 20* | 47 | 190 |

*Crystallization endotherm at 97° C.

The appearance of the polymers prepared was noted. The polymer in which none of the novel dicarboxylic acid was included was opaque. The polymer in which the novel dicarboxylic acid content was 8 percent was translucent, and the polymers in which the novel dicarboxylic acid content was 15 and 20 percent were transparent. The addition of the novel dicarboxylic acid imparts the properties of translucence or transparence to polymers. Further, the addition of the novel dicarboxylic acid imparts improved processability by lowering the melt temperature of the polymers prepared.

What is claimed is:

1. A compound corresponding to the formula

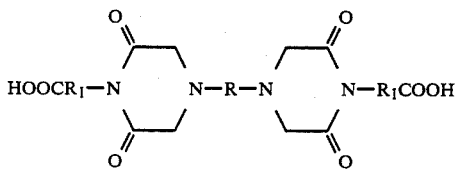

(I)

wherein
R is a $C_{1-20}$ alkylene group, phenylene group, arylalkylene group, cycloalkylene group, diphenylene group, or $-R_2-X-R_2-$;
X is O, S or $SO_2$;
$R_2$ is a $C_{1-10}$ alkylene group, phenylene group, arylalkylene group or a cycloalkylene group; and
$R_1$ is a $C_{1-20}$ alkylene group, phenylene group, arylalkylene group or a cycloalkylene group.

2. The compound of claim 1 wherein R is a $C_{1-5}$ alkylene group, phenylene group, diphenylene group or $-R_2-X-R_2-$ wherein $R_2$ is a phenylene group or a $C_{1-5}$ alkylene group.

3. The compound of claim 1 wherein R is an ethylene group, phenyl group or $-R_2-X-R_2-$ wherein $R_2$ is ethylene or phenylene.

4. The compound of claim 1 wherein $R_1$ is a $C_{1-5}$ alkylene group or a phenylene group.

5. The compound of claim 1 wherein $R_1$ is a methylene group, a pentamethylene group or a phenylene group.

6. A process for the preparation of a dicarboxylic acid represented by the formula

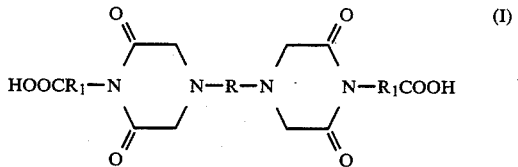

(I)

comprising contacting an alkylene or arylene diaminetetraacetic anhydride represented by the formula

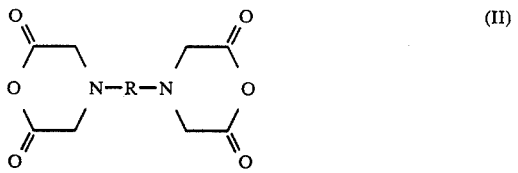

(II)

with an amine-substituted carboxylic acid represented by the formula

$H_2N-R_1-COOH$ (III)

in a solvent comprising a high boiling phenolic compound and an aromatic hydrocarbon capable of forming an azeotrope with water, refluxing the mixture, and removing the water formed in the process as an azeotrope with the aromatic hydrocarbon, until such time as the azeotrope is water-free; wherein
R is a $C_{1-20}$ alkylene group, phenylene group, arylalkylene group, cycloalkylene group, diphenylene group, or $-R_2-X-R_2-$;
X is O, S or $SO_2$;
$R_2$ is a $C_{1-10}$ alkylene group, phenylene group, arylalkylene group or a cycloalkylene group; and
$R_1$ is a $C_{1-20}$ alkylene group, phenylene group, arylalkylene group or a cycloalkylene group.

7. The process of claim 6 wherein about 2 moles of the amine-substituted carboxylic acid is contacted with about 1 mole of alkylene or arylene diaminetetraacetic anhydride.

8. A moldable polymer prepared from between about 1 and 100 mole percent of the diamine salt of a compound of claim 1 represented by formula (I)

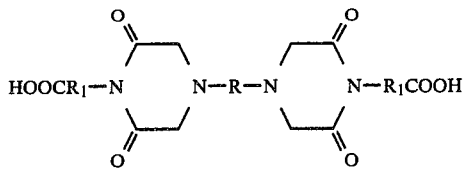

and between about 0 and 99 mole percent of the diamine salt of the compound represented by the formula HOOC—(—R₄—)—COOH wherein the diamine is represented by the formula H₂N—R₃—NH₂ wherein R is a $C_{1-20}$ alkylene group, phenylene group, arylalkylene group, cycloalkylene group, diphenylene group, or —R₂—X—R₂—;

X is O, S or SO₂;

R₂ is a $C_{1-10}$ alkylene group, phenylene group, arylalkylene group or a cycloalkylene group;

R₁ is a $C_{1-20}$ alkylene group, phenylene group, arylalkylene group or a cycloalkylene group; and R₃ is a $C_{1-12}$ alkylene group, cyclohexylene,

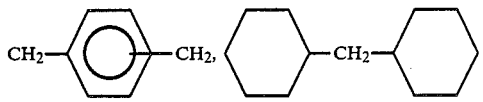

and

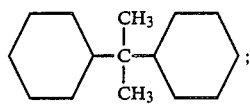

and R₄ is a $C_{1-10}$ alkylene group or a phenylene group.

* * * * *